Jan. 30, 1962 W. E. STANGER 3,019,036
RETRACTABLE FLANGE COUPLING UNIT
Filed Feb. 24, 1959 2 Sheets-Sheet 2
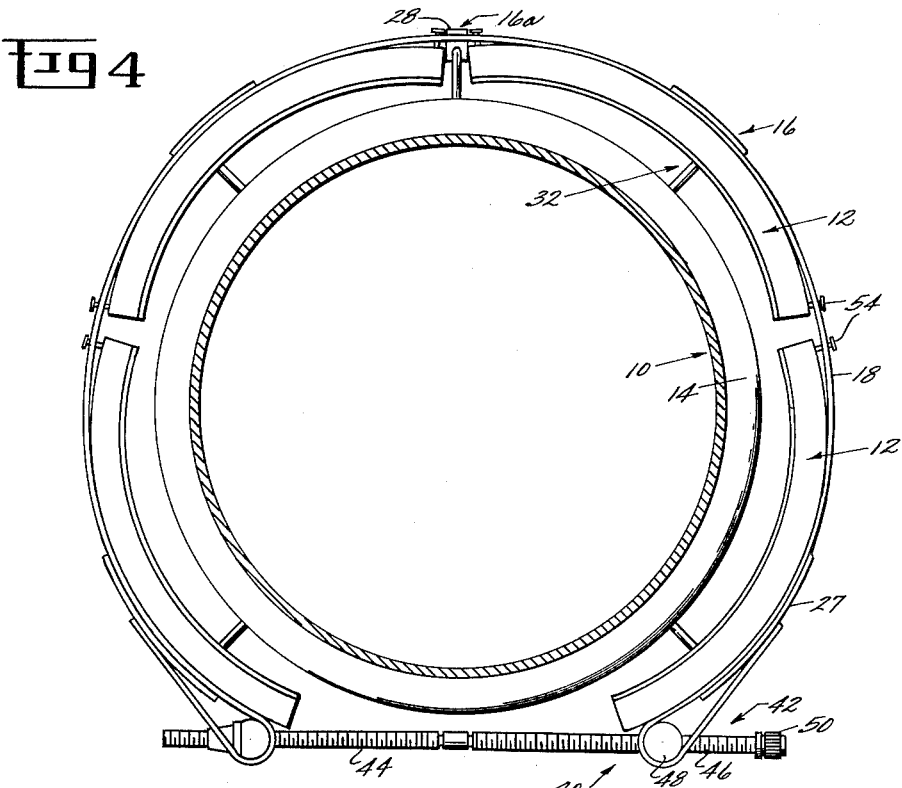
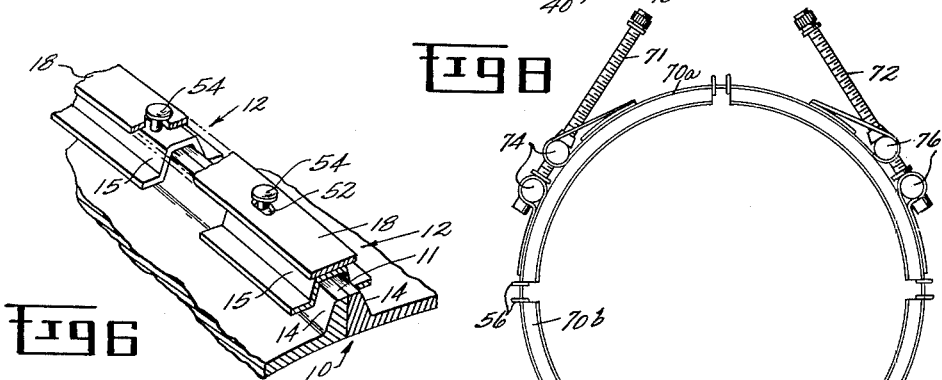
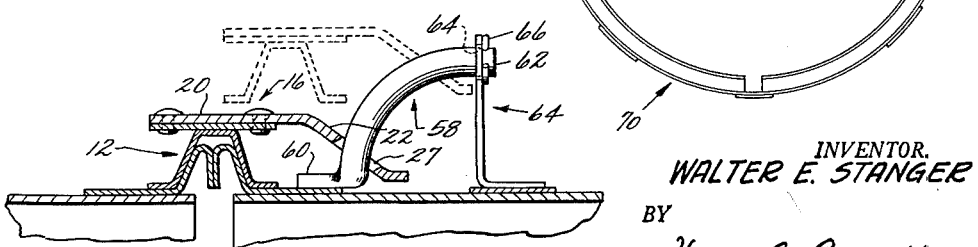
INVENTOR.
WALTER E. STANGER
BY
Harry C. Burgess
ATTORNEY United States Patent Office 3,019,036
Patented Jan. 30, 1962

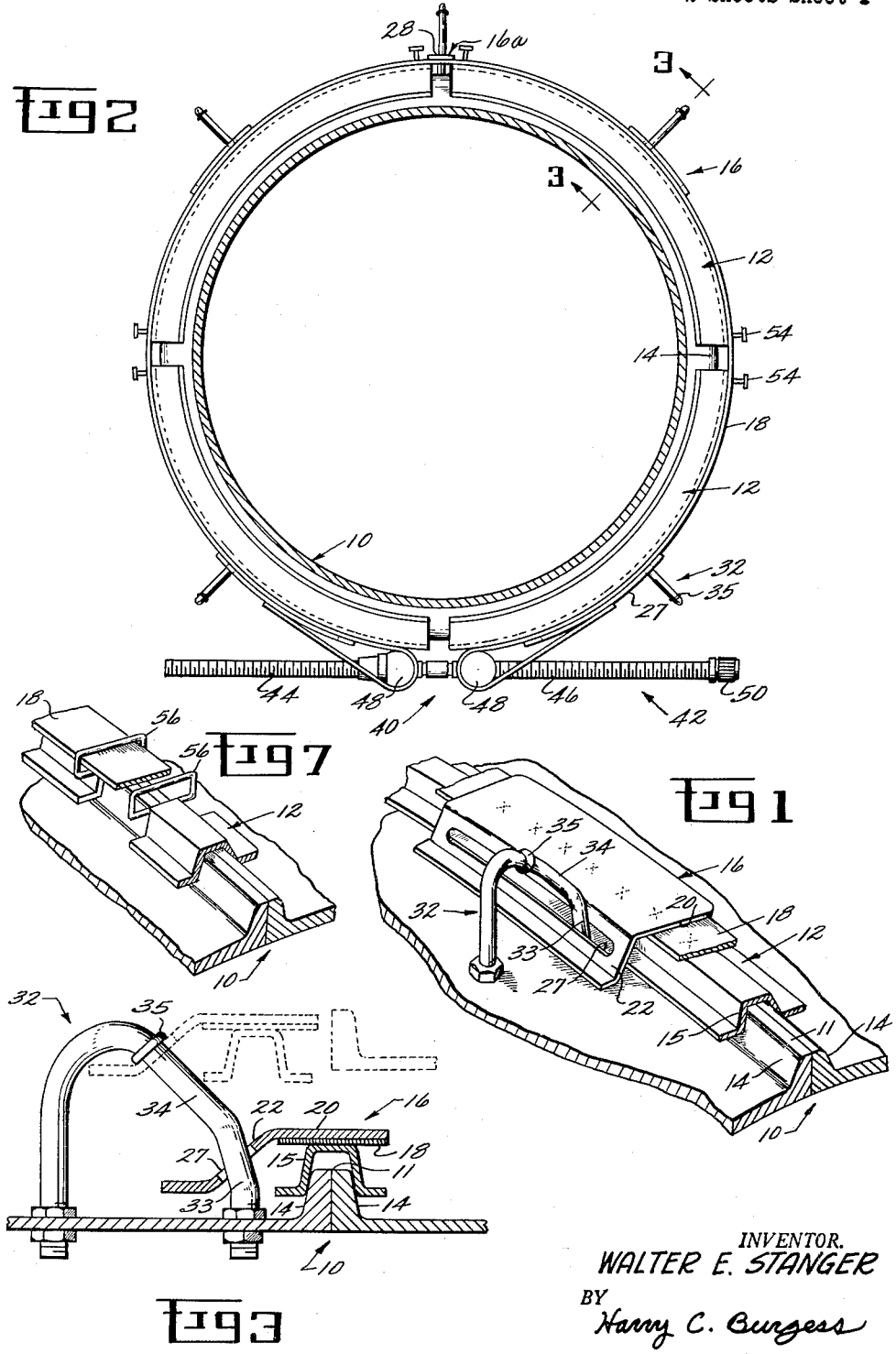

3,019,036
RETRACTABLE FLANGE COUPLING UNIT
Walter E. Stanger, Cincinnati, Ohio, assignor to General Electric Company, a corporation of New York
Filed Feb. 24, 1959, Ser. No. 795,019
7 Claims. (Cl. 285—18)

My invention relates to a coupling unit having clamping means for a pair of abutting flanges and, more particularly, to a coupling unit having mounting means providing for radial and axial movement of the clamping means relative to the abutting flanges.

Where a conduit is constructed of a number of sections of ducting, it is customary to provide on the ends of each duct section outwardly-extending flanges designed to abut similar flanges on adjacent duct sections. Where metal duct sections are used to construct more or less permanently installed conduits, such as underground pipes, the flanges are usually connected by a suitable metal joining process, e.g., welding. However, where it is contemplated that the duct sections might later have to be separated, it is desirable to use some sort of a removable coupling unit. Such a unit may include a circular clamp containing a plurality of V-shaped members attached to a resilient metal band. The coupling unit is usually positioned concentric of the abutted flanges and contains operable means for constricting or expanding the resilient band to move the V-shaped flange-engaging members in and out radially. If desired, the unit may be permanently mounted on one of the duct sections with the mounting means allowing the clamp to expand sufficiently to permit removal of the adjacent duct section in an axial direction.

In the case of conduits positioned in remote or inaccessible locations, which could require the use of remote handling equipment, such as a tool-holding "manipulator," it would be desirable, and might even be necessary, to be able to separate adjoining duct sections by immediate movement of either section radially as well as axially, with respect to the duct axis. Such immediate radial apart movement could be damaging to the coupling unit, especially if a "manipulator" were being used and, in fact, might be impossible if the clamp remained concentric to the flanges after it had expanded sufficiently to allow axial apart movement of the duct sections.

Accordingly, it is an object of my invention to provide a coupling unit affixed to one of a pair of remote or inaccessible duct sections having abutting flanges, the unit having flange clamping members operable to move radially and axially with respect to the duct axis.

Briefly, in accordance with one aspect of my invention, I provide an abutting duct flange coupling unit having means for mounting a plurality of clamping members for radial and axial movement relative to the abutted flanges, the mounting means including at least one curved guide member.

While the specification concludes with claims particularly pointing out and distinctly claiming the subject matter which I regard as my invention, it is believed the invention will become more apparent when read in the light of the accompanying specification and drawings wherein:

FIGURE 1 is a pictorial view showing one embodiment of the clamp mounting means and, FIGURE 2 is an end view of one embodiment of the coupling unit with the V-shaped members engaging the abutted duct flanges and, FIGURE 3 is an elevation, partly in section, of the V-shaped clamping members in position on the abutted flanges, utilizing one form of guide means and, FIGURE 4 is an end view of one embodiment of the coupling unit with the V-shaped members expanded clear of the abutted duct flanges and, FIGURE 5 is an elevation, partly in section, showing another embodiment of the guide means and, FIGURE 6 is a pictorial view of a means of connecting the V-shaped clamping members and, FIGURE 7 is a pictorial view of a further means of connecting the V-shaped clamping members and, FIGURE 8 is an end view of a modification of the coupling unit control and operating means.

Referring now more particularly to FIG. 1 of the drawings, reference numerals 10—10 refer generally to the ends of two duct sections having abutting flanges 11—11.

I provide means for clamping the abutted flanges together in the form of a coupling unit which includes a plurality of arcuate, substantially V-shaped clamping members, well-known in the art. The members, indicated generally at 12, are adapted to be disposed circumferentially about the abutted flanges, as shown in FIG. 2. In the drawings, the clamping members are four in number, but it is obvious that any number could be utilized in keeping with the spirit of my invention. In any event, when engaging the flanges, the members preferably form a substantially continuous encircling clamp. To facilitate the clamping action, the duct flanges may be provided with convergent outer walls 14—14 adapted to coact with the divergent walls 15—15 of the substantially V-shaped clamping members.

One embodiment of my novel mounting means, designed to support the V-shaped members about the abutted flanges and obtain both axial and radial movement of the members relative thereto, is best shown in FIGS. 1 and 4 and comprises: a plurality of brackets, generally referred to at 16; a single bracket 16a; a transversely-split resilient metal band 18; and restraining and guide means, indicated generally at 32.

By referring to the drawings, it will be seen that each of the brackets 16 and 16a has an outer portion 20 adapted to be attached to the circumference of the resilient metal band by any suitable means, such as welding or brazing. The brackets, as shown, also have a second portion 22, which forms an extension of the first-mentioned portion, and which is preferably bent inward toward the duct surface at approximately a 45° angle, although this exact configuration is not essential to the operation of the mounting. The bent portions 22 of the brackets 16 contain circumferentially-extending slots 27, while the bent portion of the single bracket 16a has a circular aperture 28.

As shown, the brackets are attached to the outer circumference of the resilient band 18 and the V-shaped, flange-engaging members are supported by being attached about the inner-circumference of the band. In keeping with the spirit of my invention, however, other arrangements could be utilized, such as attaching the bracket outer portion 20 directly to the periphery of the V-shaped member, with the resilient band then being fastened to the opposite surface of the outer portion of the bracket.

One embodiment of the restraining and guide means for the V-shaped clamping members is perhaps best illustrated in FIGS. 1 and 3. The guide means there shown comprise a plurality of curved rods, indicated generally at 32, adapted to be received in the aforementioned slots 27 and the aperture 28, of the bracket 16 and the bracket 16a, respectively. The guide rods have a generally U-shaped configuration, with the arms of the U being embedded in, or attached to, the duct and aligned in a plane parallel to the duct axis, as shown in FIG. 2.

By referring to FIG. 3, it will be noted that the U-shaped rod arms nearest the abutted flanges are constructed and arranged to slant axially away from the flanges. Each of these "slanted" arms contains a first angled portion 33, directed back from the abutted flanges at an angle approximately 15° from a line normal to the duct surface and in a plane with the arm. A second, more sharply angled portion 34, intermediate the first-mentioned portion 33 and the remainder of the U-shaped rod, slants back at an angle approximately 45° from the aforementioned normal.

Attached to the U-shaped rods are stop means for the brackets 16 and 16a. The stop means are adapted to project from the rod surfaces and may take the form of a washer 35 welded to each guide guide rod at or near the junction of the second angled portion 34 and the remainder of the U-shaped rod. Washers are particularly adaptable to abut supporting brackets having bent portions, such as the portions 22 of brackets 16 and 16a, as is shown in FIG. 3. In any event, the stop means will prevent further outward movement of the supporting brackets on the guide rods and will also force the resilient band to assume a position substantially concentric to the duct when fully expanded.

I provide means for imparting movement to the V-shaped members about the flanges comprising operating means connected to the band ends, indicated generally at 40. The operating means may take the form of a typical threaded connector, or tie-bolt, indicated generally at 42, having right and left hand threaded portions 44 and 46, respectively. The tie-bolt is adapted to be inserted through a pair of threaded trunnions 48—48 which are secured to the band ends and may be provided with a nut 50 to facilitate the turning movement. Obviously, a single left or right hand screw could be substituted for the tie-bolt 42, in keeping with the spirit of my invention.

To utilize my duct-mounted coupling unit, the tie-bolt is turned in the desired direction to contract or expand the resilient band 18, thus altering the diameter of the "ring" formed by the clamping members 12. Assuming a situation such as is shown in FIGS. 2 and 3, i.e., where the V-shaped members are astride the abutted flanges, if the resilient band is expanded, the brackets 16 and 16a will start to ride up on the first angled portion 33 of the "slanted" arms of the U-shaped guide rods 32. It should be noted, at this point, that the angle of these first portions 33 and the size of the bracket openings 27 and 28, are such that no binding will occur during this outward movement of the brackets even though the walls of the bracket openings may be in contact with the guide rods while the divergent walls 15—15 of the V-shaped members are still in contact with the abutted flanges. As the tie-bolt continues to turn to expand the resilient band, the brackets will begin to ride on the second angled portions 34. Since these second portions are more sharply slanted away from the abutted flanges than the first-mentioned portions 33, the brackets, and hence the V-shaped members, will move axially, as well as radially, relative to the abutted flanges. The brackets will continue to move axially, and radially, until the bent portions 22 of the brackets abut the stops 35.

It should be pointed out that not all the brackets will abut the stops simultaneously, i.e., the brackets nearest the band ends will contact the stops first, with the remainder of the brackets coming into abutment as a result of a small amount of circumferential movement approximately equal to the width of the slots 27. This is due to the slight tendency for the "halves" of the transversely-split resilient band 18 to pivot away from each other about a point 180° from the band ends, i.e., at bracket 16a. However, by means of the circumferentially-extending slots 27, this inherent design tendency for slight circumferential movement is permitted, except, of course, at bracket 16a. This latter bracket, with its circular aperture 28, is utilized to prevent the clamping members from freely rotating about the abutted flanges. This feature makes my invention especially desirable for use in an inaccessible location wherein a remotely-controlled "manipulator" might be required for turning the tie-bolt.

When all the stops 35 are finally abutted by the brackets, the entire coupling clamp will be clear of the center line of the abutted flanges, with the V-shaped members disposed substantially concentric to the duct section on which the clamp is supported, as shown in FIGS. 3 and 4. The adjoining duct section may now be moved immediately in a radial direction relative to the axis of the duct section upon which the coupling unit is mounted, as well as axially, without any interference from the coupling unit or damage to it.

Due to the slight bending movement of the resilient band 18, described above, it has been found desirable, although not absolutely necessary, to provide some freedom of movement of the V-shaped members 12 relative to the band. One means of allowing such movement comprises providing a plurality of holes 52 in the resilient band, adapted to receive rivets 54 which are attached to the periphery of the V-shaped clamping members adjacent the ends thereof, as shown in FIG. 6. To give the desired freedom of movement, the rivet shanks are of a smaller diameter than the holes 52, and are long enough to allow for a substantial gap between the bottom surface of the rivet head and the upper surface of the band. As can be seen in FIG. 4, when the resilient band expands to a point where all the stops 35 are in abutment with the brackets, the band will be somewhat "horseshoe" in shape. Since the arcuate, V-shaped members are fairly rigid, they will preferably be affixed to the resilient band near their centers only, as opposed to being attached along their entire lengths. When used in conjunction with the rivets, this allows the band and clamping members to separate slightly near the ends of the members, as shown in the drawing, when the band is fully expanded.

FIGURE 7 illustrates wire retainers 56 for the clamping members designed to perform the same function as the rivets 54. The retainers may be formed by affixing one end of a short piece of wire to the periphery of the clamping member and bending the free end of the wire around the resilient band, encircling it, and back into position on the clamping member periphery, adjacent the first-mentioned wire end, where it is also affixed.

By utilizing U-shaped guide rods having both ends secured to the duct an extremely rigid mounting assembly is provided for the clamping members. However, in keeping with the spirit of my invention, the restraining and guide means may comprise any suitably curved member, or members, adapted to extend from adjacent the abutted duct flanges, axially back from the flanges to some point above the duct surface.

For example, in FIG. 5, there is shown one of a plurality of restraining and guide members in the form of a cam, indicated generally at 58, having one end attached to the duct at 60. The free end 62 of the cam is supported above the duct surface by means of a resilient L-shaped bracket, indicated generally at 64, attached to the duct at a point back of the duct flange. The upstanding portion of the L-shaped bracket is provided with means for engaging the cam end 62, such as a hole 64 adapted to receive the cam end. The cam end is secured in the hole by providing suitable retaining means, such as a hole (in the cam) and cotter pin combination, indicated generally at 66. For removal of the clamp and bracket assembly say, to repair or replace one of the V-shaped members, the cotter pins are merely withdrawn and the L-shaped brackets sprung backward to allow the cam ends 62 to slip out of the holes 64.

FIG. 8 illustrates an alternate form of operating means for imparting movement to the V-shaped clamping members, particularly useful in seating the clamping members of relatively large clamps, comprising a two-piece resilient metal band, indicated generally at 70. As shown, in the drawing, the band consists of a small section 70a comprising an arc of 90°, or thereabouts, and a large section 70b. The small section is adapted to be positioned between two connectors in the form of tie bolts 71 and 72 having left or right hand threads. The ends of the larger section 70b and the smaller section 70a are joined by use of the aforementioned tie-bolts and two pairs of threaded trunnions 74 and 76, which are attached to the respective band section ends in the usual manner. Obviously, each band section could be of equal size to achieve the improved clamp seating action.

It will be evident to those skilled in the art that various modifications of the coupling as shown may be constructed to achieve the equivalent function without departing from the scope of the claims. It is therefore intended that all matter contained in the preceding description and shown in the accompanying drawings shall be interpreted as illustrative and not limitative. What I claim as new and desire to secure by Letters Patent of the United States is:

1. For use with first and second duct sections having outwardly-projecting endless flanges adapted to abut each other and a plurality of V-shaped flange clamping members, means for mounting said clamping members on said first duct for axial and radial movement relative thereto including: a plurality of guide members, which members curve outwardly away from the duct; a plurality of brackets having apertures adapted to receive the outwardly curved guide members, the brackets supporting at least one of said clamping members; controlling means connected to the clamping members to control relative movement of said members concentrically of said first duct; and operating means affixed to said controlling means, said operating means being adapted and operable to impart axial, as well as radial, movement to said V-shaped clamping members relative to said ducts.

2. For use with first and second duct sections having outwardly projecting endless flanges adapted to abut each other and a plurality of V-shaped flange clamping members adapted and operable to engage said flanges when abutted, means for mounting said V-shaped clamping members on said first duct including: a transversely-split, resilient metal band, said band being connected about its circumference to each of said V-shaped clamping members and adapted to be positioned about said duct to control relative movement of said clamping members; operating means for causing contraction and expansion of said resilient metal bands; a plurality of support brackets for said V-shaped clamping members, said support brackets being connected to the circumference of said resilient metal band and having apertures therethrough; and a plurality of curved guide members, said guide members extending outwardly from the duct surface and being adapted to be received in said bracket apertures to provide axial, as well as radial, movement of the V-shaped clamping members relative to the duct, upon actuation of said operating means, to allow said duct sections to be moved immediately radially, as well as axially, apart without interference with the V-shaped clamping members.

3. The coupling unit mounting means as described in claim 2 wherein said curved guide members comprise a plurality of substantially U-shaped rods spaced circumferentially about said first duct surface, the rod ends being affixed to the duct in a plane parallel to the duct axis, each of the U-shaped rod arms nearest said first duct flange having an angled portion slanted away from said flanges in a generally axial direction and containing a stop adapted to prevent further movement of the support brackets after the V-shaped clamping members have cleared the center line of the abutted flanges.

4. The coupling unit mounting means as described in claim 2 wherein said curved guide members comprise a plurality of cams in the form of outwardly directed bent rods spaced about said first duct surface, one end of each rod being affixed to the duct surface, with the other ends of the rods being directed axially away from the affixed ends, relative to the duct, said other rod ends being supported by a plurality of resilient, L-shaped brackets affixed to the duct, the upstanding arms of said L-shaped brackets including apertures adapted to receive the other ends, the other rod ends having removable restraining means connected thereto to enable the ends to be secured in said L-shaped bracket apertures.

5. The coupling unit mounting means as described in claim 2 wherein the resilient metal band includes a first and a second section, said first and second sections being connected by dual operating means including a pair of threaded connectors and a plurality of threaded trunnions, said trunnions being connected to the band section ends with the threaded connectors being adapted to cause said first section ends to move relative to said second section ends, when said connectors are rotated, to cause expansion or contraction of the sectioned resilient metal band.

6. In combination with a pair of duct sections having outwardly-projecting endless flanges adapted to abut each other, a coupling unit for mounting on one of said sections, said coupling unit comprising: a transversely-split resilient metal band adapted to encircle said ducts; operating means attached to the ends of said band for expansion and contraction thereof, said operating means including a pair of threaded trunnions secured to the band ends and a threaded tie-bolt adapted to engage said trunnions; a plurality of clamping members connected to said band in spaced succession and adapted and operable to engage said flanges when abutted; a plurality of support brackets for said clamping members, said brackets including angled portions containing apertures; and a plurality of curved guide members adapted to be received in said bracket apertures, said guide members being affixed to one of said duct sections, the guide members slanting outwardly and away from said duct flange and including a stop for said brackets, said guide members being so arranged and constructed that when said operating means acts to expand said resilient band and said connected clamping members radially outward from said abutted flanges, the guide members will cause said support brackets to move axially, as well as radially, of the flanges to a position against the stops to permit immediate radial relative movement of said duct sections without interference with the clamping members of the mounted coupling unit.

7. In combination with a pair of duct sections having outwardly-projecting endless flanges adapted to abut each other, a coupling unit for mounting on one of said sections, said coupling unit comprising: a transversely-split resilient metal band adapted to encircle said ducts; operating means attached to the ends of said band for expansion and contraction thereof; a plurality of arcuate clamping members connected to said band in spaced succession and adapted to engage said flanges when abutted; a plurality of first support brackets secured to said band, said brackets having slots therein which extend circumferentially with respect to said ducts; a second support bracket, said second support bracket being secured to said band 180° from the band ends and having a circular aperture therein; and a plurality of guide members adapted to be received in said first support bracket slots and said second support bracket aperture, said guide members being affixed to said one duct section and including stop means for said brackets, said members having at least one portion slanting outwardly and away from said duct section flange in a generally axial direction, said guide member being so constructed and arranged that when said operating means expands said resilient band and said connected clamping members radially outward from said abutted flanges, said first and second support brackets will ride upon the slanting portion of said guide members to a position adjacent said stop means to permit immediate radial apart movement of said duct section without interference with the clamping members.

References Cited in the file of this patent

UNITED STATES PATENTS

| | | |
|---|---|---|
| 1,646,463 | Stokesberry | Oct. 25, 1927 |
| 2,269,664 | Hallberg | Jan. 13, 1942 |
| 2,353,572 | Kuster | July 11, 1944 |
| 2,434,219 | Morrison | Jan. 6, 1948 |
| 2,536,602 | Goett | Jan. 2, 1951 |
| 2,868,565 | Suderow | Jan. 13, 1959 |